US009233625B2

(12) United States Patent
Bastien et al.

(10) Patent No.: US 9,233,625 B2
(45) Date of Patent: Jan. 12, 2016

(54) SYSTEM AND METHOD FOR CONTROLLING ENERGY USAGE

(71) Applicant: General Electric Company, Schenectady, NY (US)

(72) Inventors: Bertrand Bastien, Garching b. Munchen (DE); Henry Young, Erie, PA (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 14/196,224

(22) Filed: Mar. 4, 2014

(65) Prior Publication Data

US 2015/0251564 A1  Sep. 10, 2015

(51) Int. Cl.
*B60L 15/00* (2006.01)
*B60L 15/20* (2006.01)
*B60L 11/18* (2006.01)

(52) U.S. Cl.
CPC ......... *B60L 15/2045* (2013.01); *B60L 11/1861* (2013.01); *B60L 2200/36* (2013.01)

(58) Field of Classification Search
CPC ... B60L 15/00; B60L 15/2045; B60L 11/861; B60L 2200/36
USPC ......... 701/19, 22, 50; 180/65.1, 65.21, 65.24, 180/65.265, 65.285, 65.31, 301; 903/902
See application file for complete search history.

(56) References Cited

U.S. PATENT DOCUMENTS

| | | | | |
|---|---|---|---|---|
| 7,349,797 B2 * | 3/2008 | Donnelly et al. | ............. | 701/115 |
| 7,715,958 B2 * | 5/2010 | Kumar | ............. | 701/22 |
| 2004/0251691 A1 * | 12/2004 | King et al. | ............. | 290/40 C |
| 2005/0235865 A1 * | 10/2005 | Kumar | ............. | 105/61 |
| 2005/0279242 A1 * | 12/2005 | Maier et al. | ............. | 105/26.05 |
| 2006/0005736 A1 * | 1/2006 | Kumar | ............. | 105/1.4 |
| 2008/0121136 A1 * | 5/2008 | Mari et al. | ............. | 105/35 |
| 2010/0019718 A1 * | 1/2010 | Salasoo et al. | ............. | 320/103 |
| 2010/0019726 A1 * | 1/2010 | Kumar | ............. | 320/125 |
| 2015/0032301 A1 * | 1/2015 | Lamba | ............. | 701/19 |

* cited by examiner

*Primary Examiner* — Thomas Tarcza
*Assistant Examiner* — Tyler J Lee
(74) *Attorney, Agent, or Firm* — GE Global Patent Operation; John A. Kramer

(57) ABSTRACT

An energy management system comprises an energy management module that electrically connects an energy storage system of a vehicle with a traction link of the vehicle, the traction link being electrically connected to a traction motor. The energy management module is configured to deliver electrical power from the energy storage system to the traction link during a haul route, according to a discharge rule that is selected by a comparison of predicted performance of a plurality of discharge rules to a baseline performance of the haul route, in which electrical power is not delivered from the energy storage system to the traction link, in order to obtain fuel savings, speed excess, or a combination of fuel savings and speed excess relative to the baseline performance.

22 Claims, 11 Drawing Sheets

SYSTEM AND METHOD FOR CONTROLLING ENERGY USAGE

BACKGROUND

1. Technical Field

Embodiments of the invention relate generally to off-highway vehicles (OHVs), such as mine trucks. Particular embodiments relate to improving fuel economy of OHVs.

2. Discussion of Art

In the mining industry, large off-highway vehicles ("OHVs") are used to haul heavy payloads excavated from open pit mines. OHVs usually employ electrically motorized wheels for propelling or retarding the vehicle in an energy efficient manner. In particular, OHVs typically utilize a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator powers a main traction power converter, in which power semiconductor devices commutate the alternator output current to provide electrical power having a controlled voltage and frequency for electric drive motors of the two wheel drive assemblies.

A typical OHV hauls anywhere from sixty to four hundred tons of material on a chassis and body weighing from about fifty up to about two hundred tons, for gross vehicle weight of as much as six hundred tons. Typical haul distances are from one to five miles depending on the age of mine, with mine road grades sometimes exceeding ten percent. Clearly, diesel fuel is a significant cost in the extraction of mineral resources. Indeed, a typical OHV fuel tank may hold more than two thousand liters of fuel. A recent government survey indicated that a single mining company's haul truck OHVs consumed nearly 30 TJ (760×10^6 liters) of diesel fuel each year.

Thus, it is highly desirable to improve the fuel economy of OHVs.

BRIEF DESCRIPTION

In embodiments, an energy management system comprises an energy management module electrically connecting an energy storage system of a vehicle with a traction link of the vehicle, the traction link being electrically connected to a traction motor. The energy management module is configured to deliver electrical power from the energy storage system to the traction link during a haul route, according to a discharge rule that is selected to optimize fuel savings, speed excess, or a combination of fuel savings and speed excess by comparison to a baseline performance of the haul route without delivery of electrical power from the energy storage system to the traction link.

In aspects, a method is provided for operating an OHV along a return route and a haul route. The OHV includes an engine and an alternator mutually configured to deliver electrical power to a fraction link, a traction motor electrically connected with the traction link, an energy storage system electrically connected with the fraction link, and an energy management module electrically connecting the energy storage system with the fraction link. The method comprises receiving a braking signal at the energy management module during the return route, and in response to the braking signal, configuring the energy management module to transfer electrical power from the traction link to the energy storage system. The method also comprises monitoring a quantity of energy transferred from the traction link to the energy storage system. The method also comprises receiving at the energy management module, during the haul route, information including at least a throttle signal; evaluating in the energy management module whether the received information establishes a discharge condition; and, in case a discharge condition is established, configuring the energy management module to transfer electrical power from the energy storage system to the traction link, according to a discharge rule.

DRAWINGS

The present invention will be better understood from reading the following description of non-limiting embodiments, with reference to the attached drawings, wherein below:

DETAILED DESCRIPTION

Figure 1:
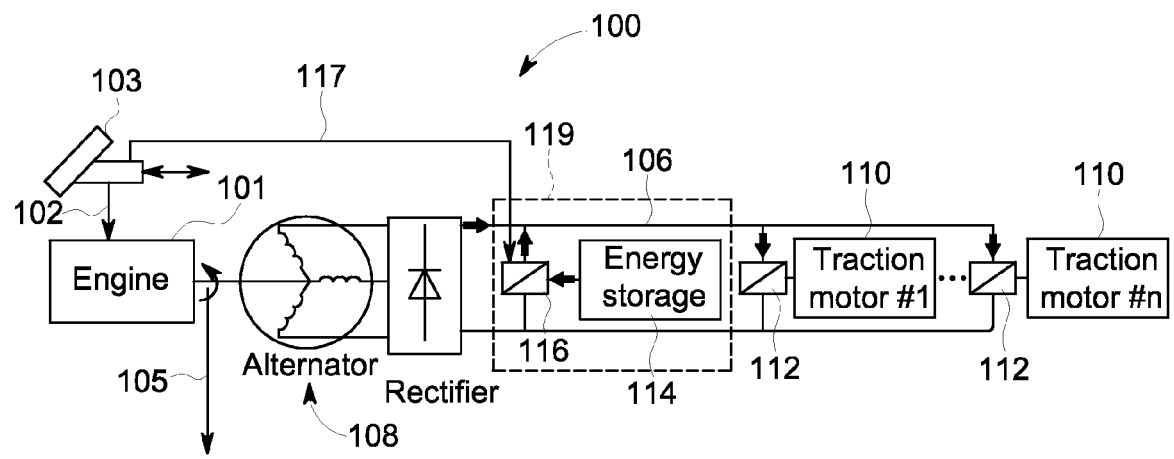
FIG. 1 shows in schematic view a power train of an off highway vehicle (OHV) according to embodiments of the invention.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to OHVs, which run repetitive routes, embodiments of the invention also are applicable for use with regenerative braking hybrid vehicles, generally.

Aspects of the invention relate to methods for determining when and how to discharge electrical energy that has been stored during regenerative braking of an OHV. For example, OHVs typically traverse an uphill haul route fully loaded, then return downhill empty. However, even on the empty run, the vehicle weight is not negligible, so that substantial electrical power can be generated by using the wheel motors as generators ("braking motors") for retarding descent ("regenerative braking"). Electrical power obtained from regenerative braking is stored; if the electrical power is merely dissipated via heating of resistor banks, then the braking is "electric braking," but is not "regenerative." At the bottom of each run, the OHV is loaded, then returns uphill. In order to permit regenerative braking on the next empty run, the stored electrical power must be used during the uphill haul. When and how to use the stored electrical power can be described by a discharge profile, which is developed according to a discharge rule that can be optimized to achieve a local minimum of fuel consumption for each round trip.

Like other vehicles, OHV engines support two types of power load: propulsive power and "hotel" power, which includes engine idling as well as climate control, communications, engine cooling, power electronics losses, hydraulic pumps and other non-propulsive systems. OHV fuel economy, in terms of fuel consumption per round trip, is optimal when round trips are accomplished in the least possible time, thereby maximizing the ratio of propulsive power to hotel power. Therefore, optimal rules for discharge profiles will produce discharge profiles that help to minimize round trip time, for example, by helping an OHV go faster on otherwise slow (uphill) parts of the haul route.

Referring to FIG. 1, an exemplary OHV 100, capable of regenerative braking, incorporates an engine 101, which is controlled in response to a throttle signal 102 provided from a pedal or other operator interface 103 in order to drive a traction alternator 104 as well as auxiliary loads 105. The alternator 104 powers a DC electrical bus (fraction link) 106 via a rectifier 108, and the pedal or other interface 103 can be adjusted to vary the signal 102 controlling the engine 101, thereby varying the electrical power provided from the engine 101 via the alternator 104 to the traction link 106. (In other embodiments, the alternator 104 may directly power an AC bus, or may power an AC bus via a power converter.) The traction link 106 is connected with a plurality of traction motors 110, via power converters 112, and also is connected with an energy storage system 114 via an energy management module 116. Together, the energy storage system 114 and the energy management module 116 form an energy management system 119. In certain embodiments, the energy management module 116 can be controlled to allocate electrical current from the traction link 106 to the energy storage system 114, to reallocate electrical charge within the energy storage system 114, or to distribute (discharge) electrical current from the energy storage system 114 to the traction link 106. For improved performance of the OHV, one or more discharge rules may be provided for regulating operation of the energy management module 116 and for coordinating the energy management module 116 with the engine 101.

Typically, the OHV 100 is run at "full throttle" (maximum power from the alternator 104 to the traction link 106) as much as possible, in order to maximize the ratio of propulsive power to hotel power, as discussed above. However, on uphill portions of a haul route, full throttle may not be sufficient to maintain desired speed of a heavily loaded OHV. As the engine 101 is scaled to optimize power/weight ratio for an average round trip, and as an up-design would necessitate cascading changes to downstream power train components, it would be preferable to simply upscale the traction motors 110 and to provide "boost" energy to the traction link from a source other than the engine 101—i.e., the energy storage system 114. Along the same line, rather than consuming power to brake the OHV on a downhill run, it would be preferable to reconfigure the traction motors 110 as braking motors, delivering electrical power to the traction link 106. For example, the energy management module 116 is configured to receive a braking signal 117 from the interface 103, and to, in response to the braking signal 117, transfer electrical power from the traction link into the energy storage system 114. The energy storage system 114 then becomes useful for transfer of power from the braking motors 110 to the fraction motors 110 via the energy management module 116, according to a discharge rule that balances braking energy with boost energy in a "regenerative energy balance," as further discussed below with reference to FIG. 2.

Referring to FIGS. 2-6, five exemplary discharge rules are presented for establishing a discharge condition to discharge the stored energy, according to embodiments of the invention. The exemplary rules include a first rule 200 (FIG. 2) that establishes the discharge condition when the main engine is at "full throttle"; a second rule 300 (FIG. 3) that establishes the discharge condition only when the main engine is at full throttle, the OHV is loaded, and the OHV is headed up hill; a third rule 400 (FIG. 4) that establishes the discharge condition when OHV speed is less than 10 mph or other designated speed threshold; a fourth rule 500 (FIG. 5) that establishes the discharge condition at full throttle when speed is less than 10 mph (or other designated speed threshold) or when the OHV is slowing down; and a fifth rule 600 (FIG. 6) that establishes the discharge condition only when the OHV main engine is at full throttle on the flat. In embodiments, the rules are predicated on discharge at a consistent rate, and incorporate steps for iteratively determining an appropriate discharge rate. In other embodiments, rules may incorporate ramped or otherwise varied discharge rates. For example, a discharge rate may be varied responsive to OHV position, acceleration, speed deficit from a threshold value, or energy storage system state of charge.

Figure 2:
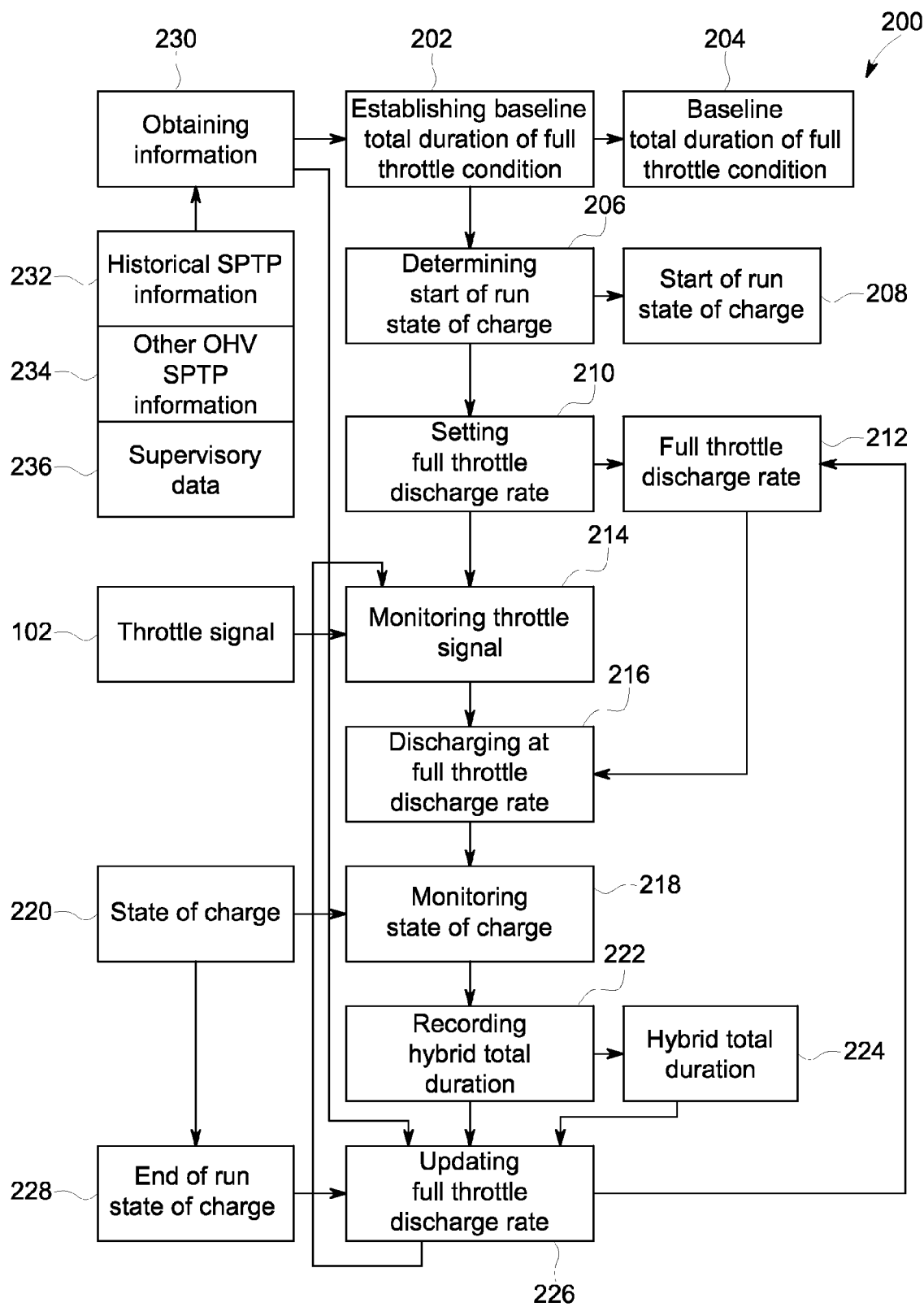
FIG. 2 shows a flowchart of a first rule for operating the power train shown in FIG. 1.

Referring now to FIG. 2, the first rule 200 includes establishing 202 a total duration 204 of "full throttle" condition during a typical non-regenerative haul run, based on obtaining 230 information external to the present implementation of the rule, such as, for example, at least one of historic speed, position, and traction power (SPTP) information 232 from at least one previous cycle; SPTP information 234 from other OHVs running the same haul route; or supervisory data 236 (e.g., externally measured or calculated values of total cycle time for the particular OHV or of average cycle time across a fleet of OHVs running the same haul route). The first rule 200 also includes determining 206 a "start of run" state of charge 208 of an energy storage system, following regenerative braking on a haul-and-return run; setting 210 a full throttle discharge rate 212 such that all of the stored energy 208 will be discharged across the total duration 204 of full throttle condition; monitoring 214 the throttle signal 102; discharging 216 at the full throttle discharge rate 212 while the throttle signal 102 is at full throttle; monitoring 218 the energy storage system state of charge 220 during the hybrid haul run; recording 222 a hybrid total duration 224 of full throttle condition for a haul run using the first rule 200; and updating 226 the full throttle discharge rate 212, based on the hybrid total duration 224 and an end-of-run state of charge 228.

In updating 226 the full throttle discharge rate 212, the energy management module 114 can also make use of information external to the present implementation of the rule, as discussed above. Based on this information and data, the full throttle discharge rate 212 can be set to achieve a "regenerative energy balance"

$$E_{\cdot batt@link} + t_{\cdot discharge} P_{\cdot engine@link} = E_{\cdot tot} \quad \text{(eq. 2)}$$

where $E_{\cdot batt@link}$ represents the end-of-run state of charge 228; $t_{\cdot discharge}$ represents the discharge time required to use up all of $E_{\cdot batt@link}$ at a trial value of the full throttle discharge rate 212; $P_{\cdot engine@link}$ represents the full throttle engine power available at the fraction power link; and $E_{\cdot tot}$ represents the total traction energy expended at full throttle in a baseline (non-hybrid) mode of operation, based on the historic SPTP information 232 and/or 234. It is presumed that, due to braking and propulsion efficiencies, $E_{\cdot batt@link} < E_{\cdot tot}$.

Ideally, energy to complete a given segment should be measured at a point of contact between the OHV tires and the road. From a practical standpoint, $E_{tot}$ would be measured at the DC traction link (i.e. where the fraction motors' inverters are connected), based on voltage and the current that can be directly measured. In order to determine the energy at the tires, it would be necessary to quantify losses between the traction link and the tires, including inverter losses, cable losses, motor losses, gear losses, and so forth. Those losses can be estimated from known models, and depend on the speed of the truck and the power delivered. However, for simplicity, it can be assumed that between a standard (i.e. baseline) run, and a hybrid-boosted run, the average efficiency between the traction link and the tires is roughly the same, so that the energies at the traction link in both cases should then be approximately equal. In the optic of enhanced accuracy, one could however account precisely for the effect of increased speed and power on the efficiency between the link and the tires, and apply the energy conservation principle at the point of contact between the tires and the road. In particular, rolling resistance should increase with speed, and an improved model would take this into account.

Figure 3:
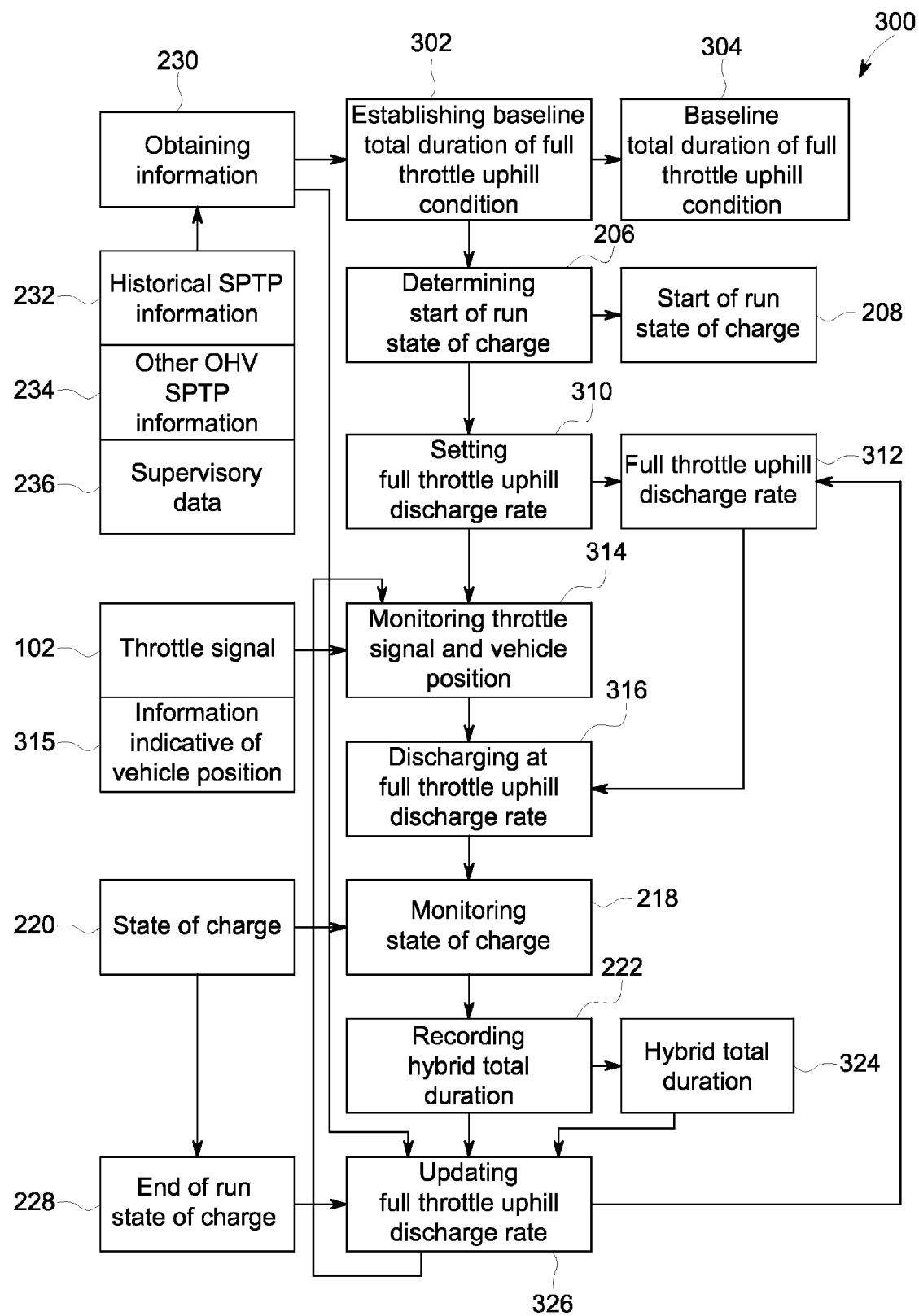
FIG. 3 shows a flowchart of a second rule for operating the power train shown in FIG. 1.

Referring to FIG. 3, the second rule 300 includes establishing 302 a total duration 304 of full throttle, uphill loaded condition during a typical non-regenerative haul run; determining 206 a start of run state of charge 208 of the energy storage system 114 following regenerative braking on a haul-and-return run; setting 310 a full throttle uphill discharge rate 312 such that substantially all of the stored energy 208 will be discharged across the total duration 304 of full throttle uphill condition; monitoring 314 the throttle signal 102 and information indicative of vehicle position 315 to detect a full throttle condition and an uphill condition; discharging 316 at the full throttle uphill discharge rate 312 during the full throttle uphill condition; monitoring 218 the energy storage system state of charge 220 during the hybrid haul run; recording 222 a hybrid total duration 324 of full throttle condition for a haul run using the second rule 300; and updating 326 the full throttle uphill discharge rate 312, based on the hybrid total duration 324 and an end-of-run state of charge 328.

The information indicative of vehicle position 315 can include any one or combination of inertial navigation, time-integration of vehicle speed (presuming the OHV remains on route), GPS data, local position transponder data, or similar information that will be apparent to skilled workers.

Updating 326 the full throttle uphill discharge rate 312 involves obtaining 330 SPTP information 232, 234 and supervisory data 236; and updating the full throttle uphill discharge rate 312 to achieve the regenerative energy balance generally as discussed above with reference to the first rule 200.

Figure 4:
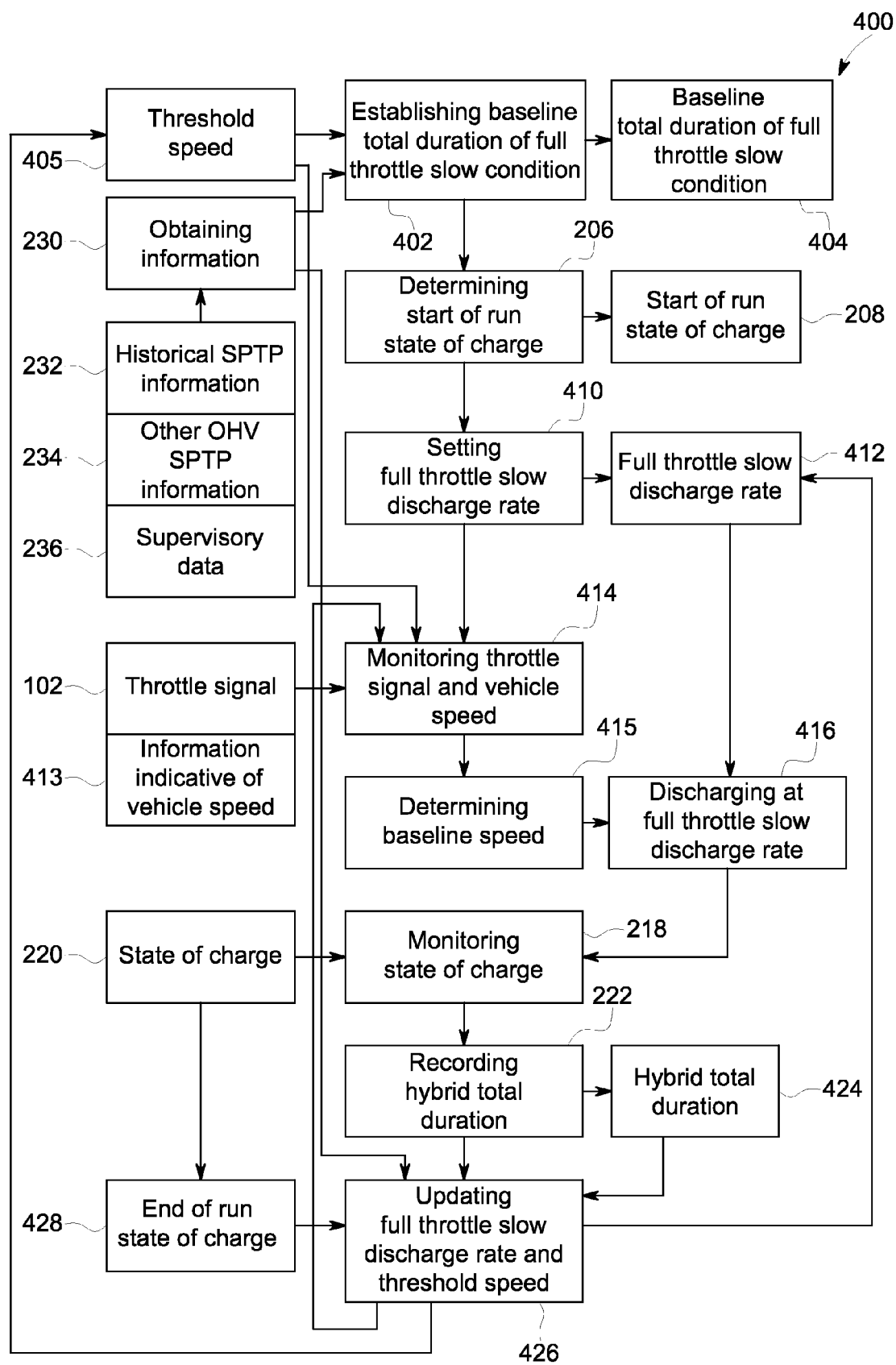
FIG. 4 shows a flowchart of a third rule for operating the power train shown in FIG. 1.

FIG. 4 shows the third rule 400, which includes establishing 402 a total duration 404 of speed less than a threshold 405 (e.g., less than 10 mph) at full throttle during a typical non-regenerative haul run; determining 206 an energy storage system state of charge 220 following regenerative braking on a haul-and-return run; setting 410 a "slow" full throttle discharge rate 412 such that all of the stored energy 208 will be discharged across the total duration 404 of full throttle, sub-threshold speed condition; monitoring 414 the throttle signal 102, and information indicative of the vehicle speed 413, and determining 415 whether the OHV speed would be below threshold 405 (e.g., less than 10 mph) without discharging stored energy (a "slow baseline" condition); discharging 416 at the "slow" full throttle discharge rate 412 while the slow baseline condition exists (stopping discharge when the throttle signal 102 is less than full throttle, when the vehicle is stopped, when state of charge 220 falls below a minimum level 209, or when slow baseline condition is not valid, in other words, when the vehicle could exceed the speed threshold without discharging stored energy); monitoring 218 the energy storage system state of charge 220 during the hybrid haul run; recording 222 a hybrid total duration 424 of full throttle, sub-threshold speed condition for a haul run using the third rule 400; and updating 426 the threshold speed 405 and the "slow" full throttle discharge rate 412, based on the hybrid total duration 424 and an end-of-run state of charge 428.

The information indicative of vehicle speed 413 can include any one or combination of inertial navigation, direct measurement of vehicle speed (presuming the OHV remains on route), GPS data, local position transponder data, or similar information that will be apparent to skilled workers.

In an embodiment, the third rule 400 will provide for regenerative "boost" throughout the full throttle slow condition, without using more energy than was captured during a previous regenerative braking cycle. However, because the algorithm requires a few cycles to converge, it could be envisioned—depending on the state of charge and capacity of the energy storage system—that 'overspending' (extra buffer or "precharge") might be needed, in order to have some margin of error. Precharging could be accomplished, for example, by over-running the main engine during idle periods, such as loading. However, if precharging is not sufficient or for any reason not feasible, then the slow full throttle discharge rate should be curtailed accordingly. On the other hand, it may be the case that not all of the energy from regenerative braking is used (underspending) during a particular haul cycle. Underspending would require increasing the rate 412 of discharging 416, or raising the threshold speed 405, for the next cycle. In particular, in case the discharge rate 412 already was set to maximum capability of the electrical system, then there would be a need to raise the threshold speed 405.

The step of determining 415 what baseline speed would be is optional, but is highly advantageous for providing hysteresis to avoid rapid cycling, and requires a subsidiary algorithm for speed correction. One simple approach is to calculate a ratio of rectifier (main engine) output power to total power at the traction link, in other words engine power over engine+battery power, and to multiply the measured speed by the power ratio. This approach assumes steady state operation, but is generally good enough to provide hysteresis and avert rapid cycling. A more complex approach is to develop a model of OHV speed and acceleration in response to traction link power at each position along the haul route, and to calculate baseline speed and acceleration based on a measurement of engine power, or based on the traction link power less the discharge rate 412.

It will be appreciated that, because the step of discharging 416 enhances the net power provided at the wheel motors, application of the third rule 400 will naturally tend to make the hybrid total duration 424 less than the non-regenerative total duration 404. Indeed, each successive application of the third rule 400 will tend to further reduce the hybrid total duration 424, although the further reductions of hybrid total duration will iteratively diminish toward a convergent value.

Figure 5:
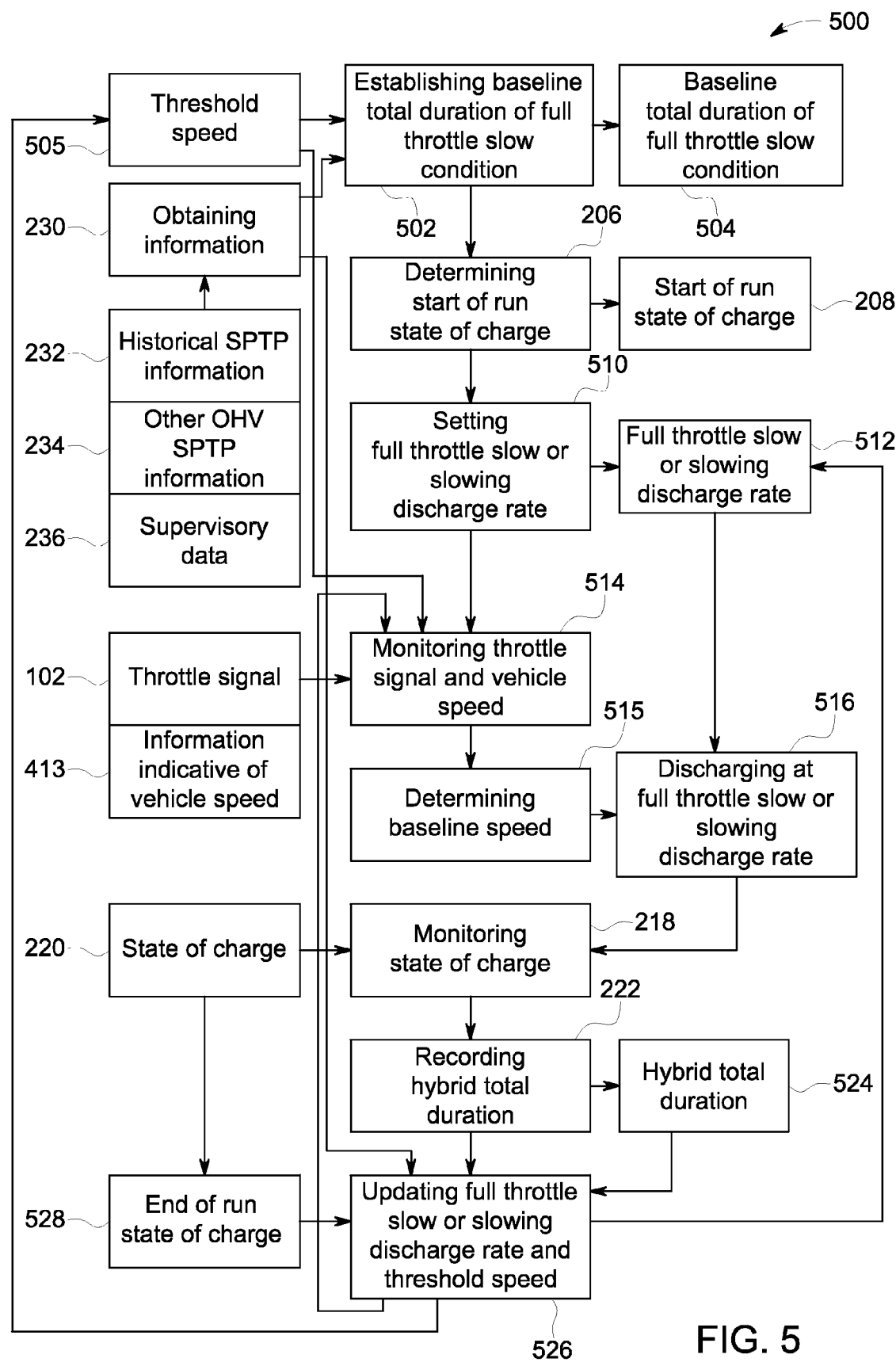
FIG. 5 shows a flowchart of a fourth rule for operating the power train shown in FIG. 1.

FIG. 5 shows the fourth rule 500, which includes establishing 502 a total duration 504 of speed less than a threshold 505 (e.g., less than 10 mph), or speed decreasing, at full throttle during a typical non-regenerative haul run; determining 206 an energy storage system state of charge 220 following regenerative braking on a haul-and-return run; setting 510 a "slow or slowing" full throttle discharge rate 512 such that all of the stored energy 208 will be discharged across the total duration 504 of full throttle, sub-threshold or decreasing speed condition; monitoring 214 the throttle signal 102 as well as information indicative of OHV speed 413; when the throttle signal 102 is at full throttle, determining 515 whether the OHV speed would be below threshold (e.g., less than 10 mph) or decreasing, without discharging stored energy to supplement the main engine ("baseline speed"); in case speed would be "slow or slowing," without discharging, then discharging 516 at the slow or slowing full throttle discharge rate 512; monitoring 218 the energy storage system state of charge 220 during the hybrid haul run; recording 222 a hybrid total duration 524 of full throttle, sub-threshold or decreasing speed condition for a haul run using the fourth rule 500; and updating 526 the threshold speed 505 and the slow or slowing full throttle discharge rate 512, based on the hybrid total duration 524 and an end-of-run state of charge 528.

In application of the fourth rule 500, the step of determining 515 whether the OHV speed would be slow or slowing, without discharging, is optional, but is particularly advantageous for providing hysteresis to prevent rapid cycling between discharge/non-discharge states. In other embodiments, the fourth rule 500 may instead include discharging 515 while the OHV is at full throttle with actual speed below the threshold 505 (e.g., less than 10 mph) or decreasing. In other embodiments, the fourth rule 500 may instead include discharging 515 while the OHV is at full throttle with actual speed below the threshold 505 and not increasing at a desired rate.

Figure 6:
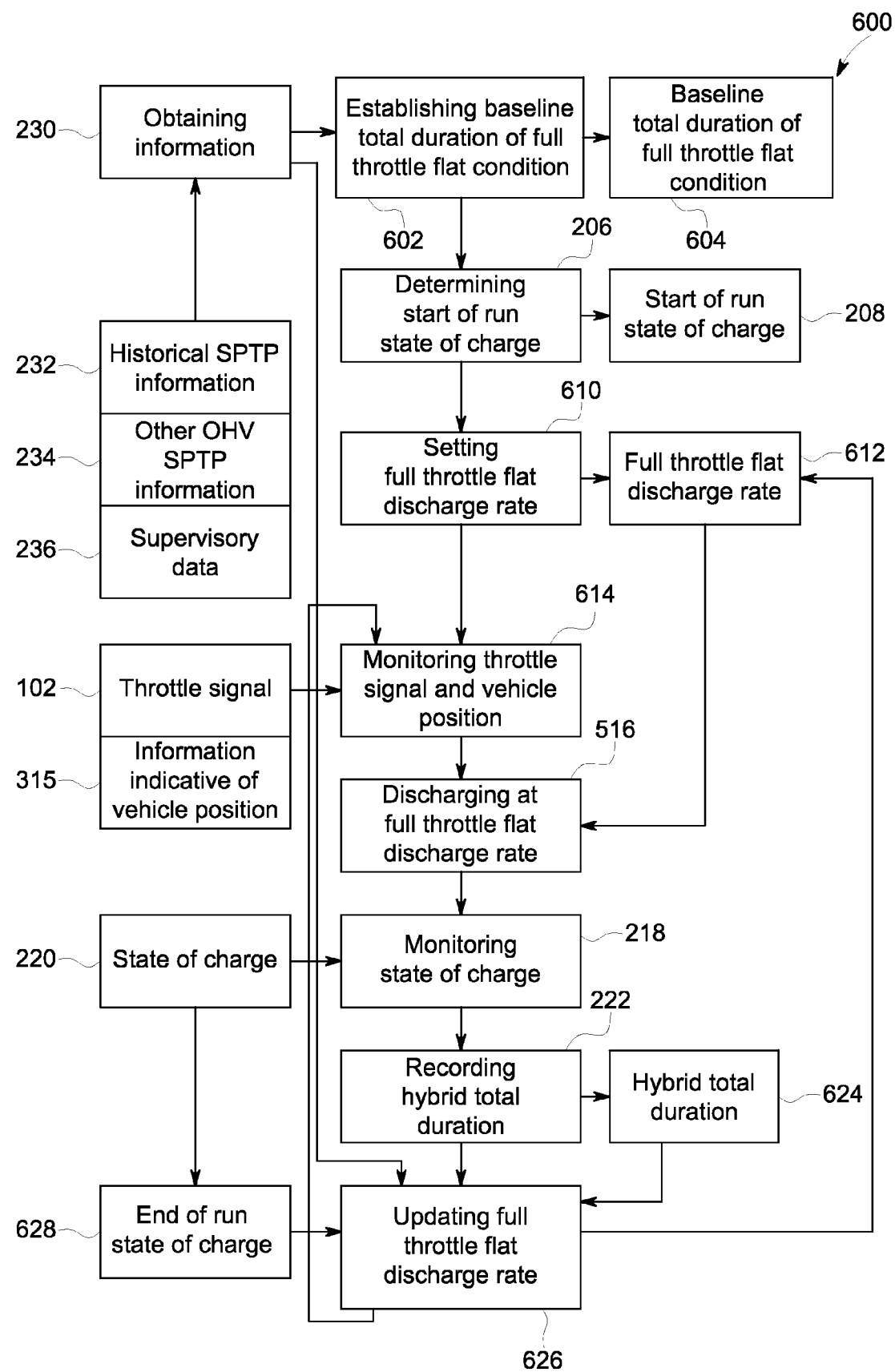
FIG. 6 shows a flowchart of a fifth rule for operating the power train shown in FIG. 1.

Referring to FIG. 6, the fifth rule 600 includes establishing 602 a total duration 604 of full throttle condition on substantially flat road, during a typical non-regenerative haul run; determining 206 an energy storage system state of charge 220 following regenerative braking on a haul-and-return run; setting 610 a flat out discharge rate 612 such that all of the stored energy 208 will be discharged across the total duration 604 of full throttle, on-flat condition; monitoring 214 the throttle signal 102 as well as information 315 indicative of vehicle position; discharging 616 while at full throttle on substantially flat road; monitoring 218 the energy storage system state of charge 220 during the hybrid haul run; recording 222 a hybrid total duration 624 of full throttle flat out condition for a haul run using the fifth rule 600; and updating 626 the flat out discharge rate 612, based on the hybrid total duration 624 and an end-of-run state of charge 628.

The disclosed rules 200, 300, 400, 500, 600 are merely exemplary and additional rules can be devised according to particular routes and situations. As an example, although the instant description is focused on uphill hauling, in certain settings it is common for haul routes to include downhill segments.

Figure 7:
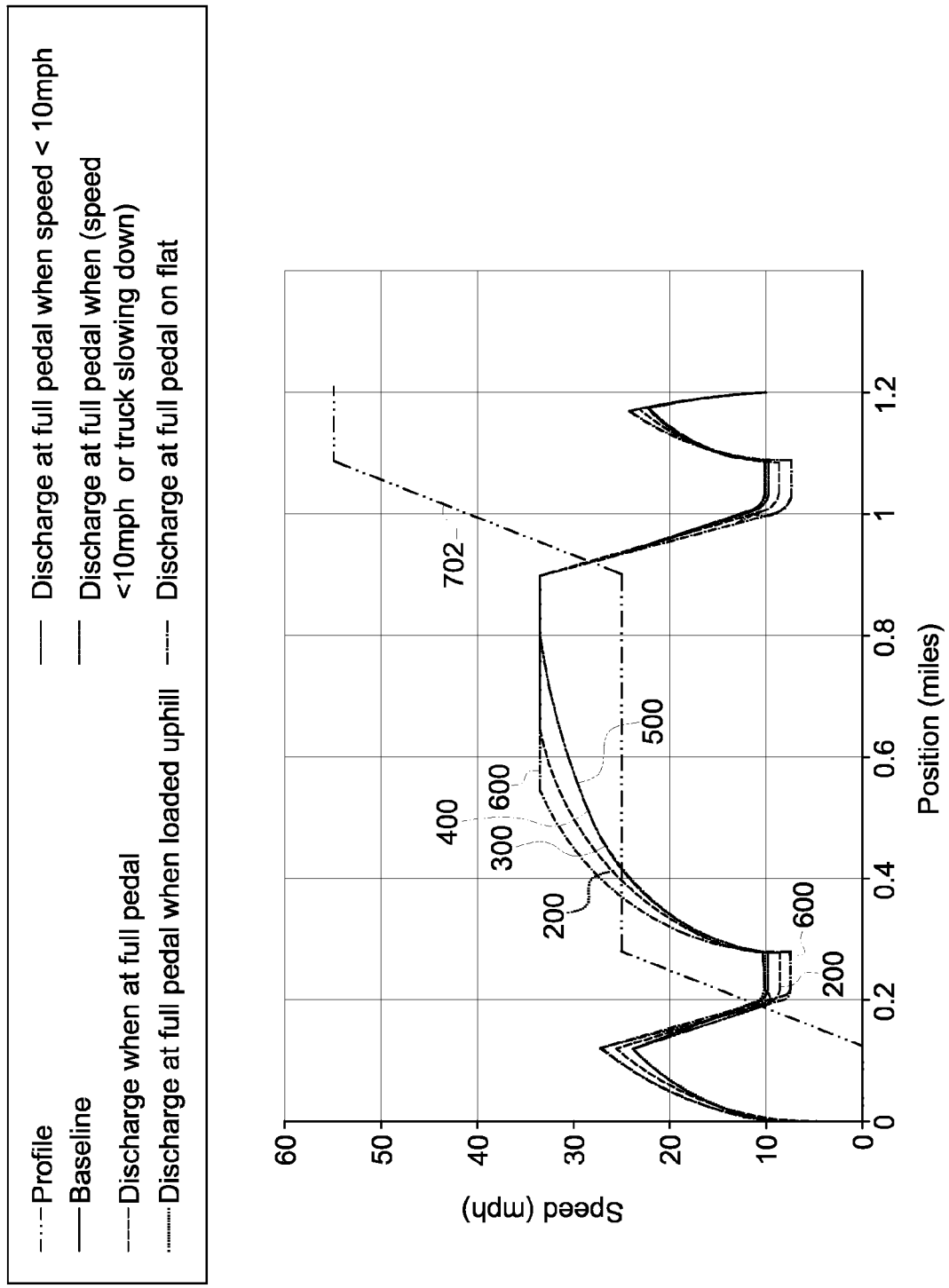
FIG. 7 shows an exemplary haul route elevation profile, and speed vs. position plots for implementations along the exemplary haul route of the rules shown in FIGS. 2-6.

A general goal of regenerative braking is to improve haul speed, above a "baseline" haul speed for non-regenerative braking. A speed above a baseline of this type is referred to as "speed excess." FIG. 7 shows a plot of speed vs. position for each of the five exemplary discharge rules, by comparison to the baseline speed vs. position, overlaid on a plot of an elevation profile 702 of an exemplary haul route (speed in mph, position along route in mi, elevation in m). The elevation profiles of the five exemplary haul segments are:

| Segment | Endpoint position along route (m) | Rise (m) |
|---|---|---|
| 200 m flat | 199.9987 | 0 |
| 250 m uphill | 448.76619 | 25 |
| 1000 m flat | 1448.75969 | 0 |
| 300 m uphill | 1747.2131 | 30 |
| 200 m flat | 1947.2118 | 0 |

Figure 8:
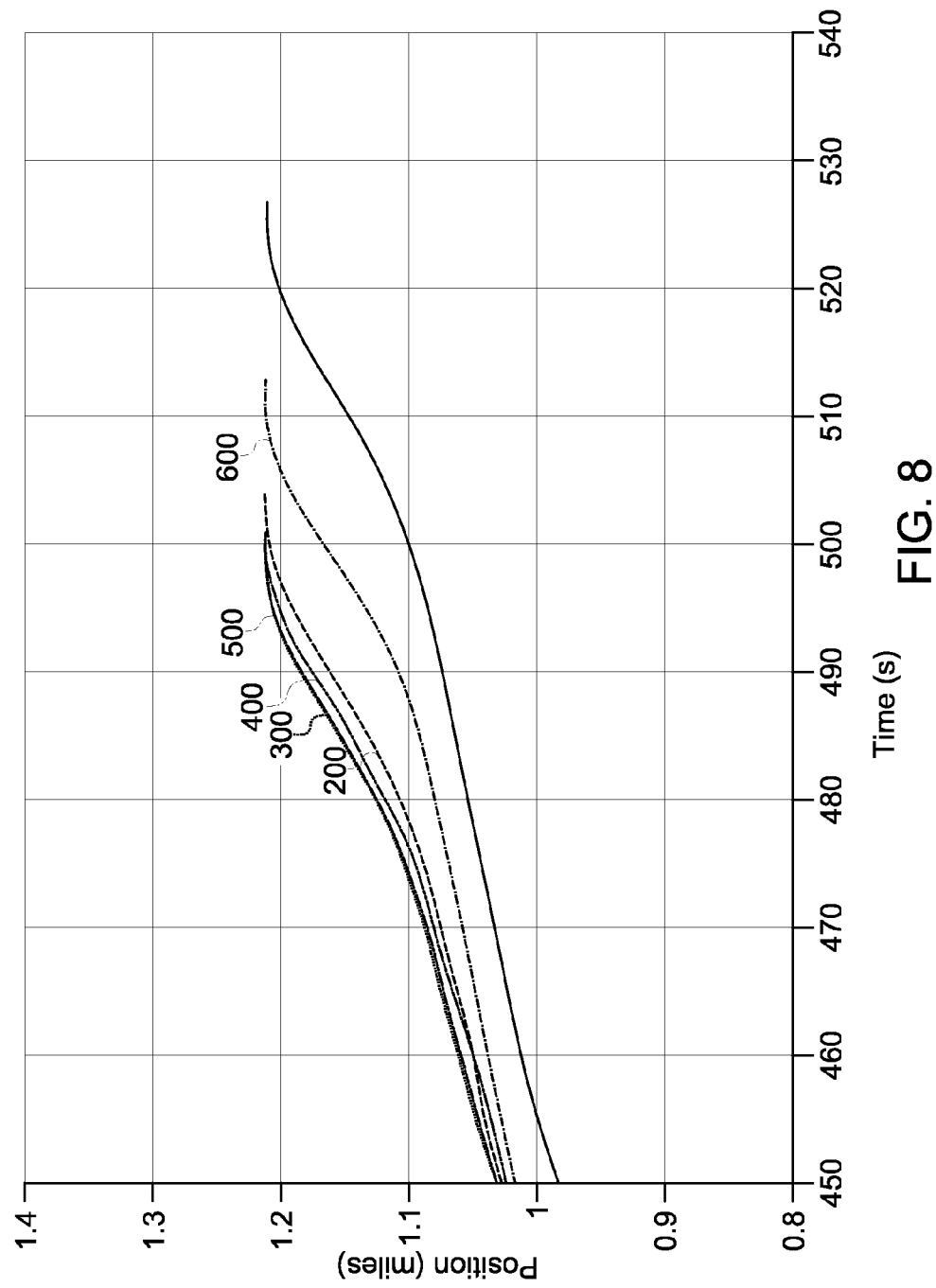
FIG. 8 shows position vs. time plots for the rules shown in FIGS. 2-6, when implemented along the exemplary haul route shown in FIG. 7.
Figure 9:
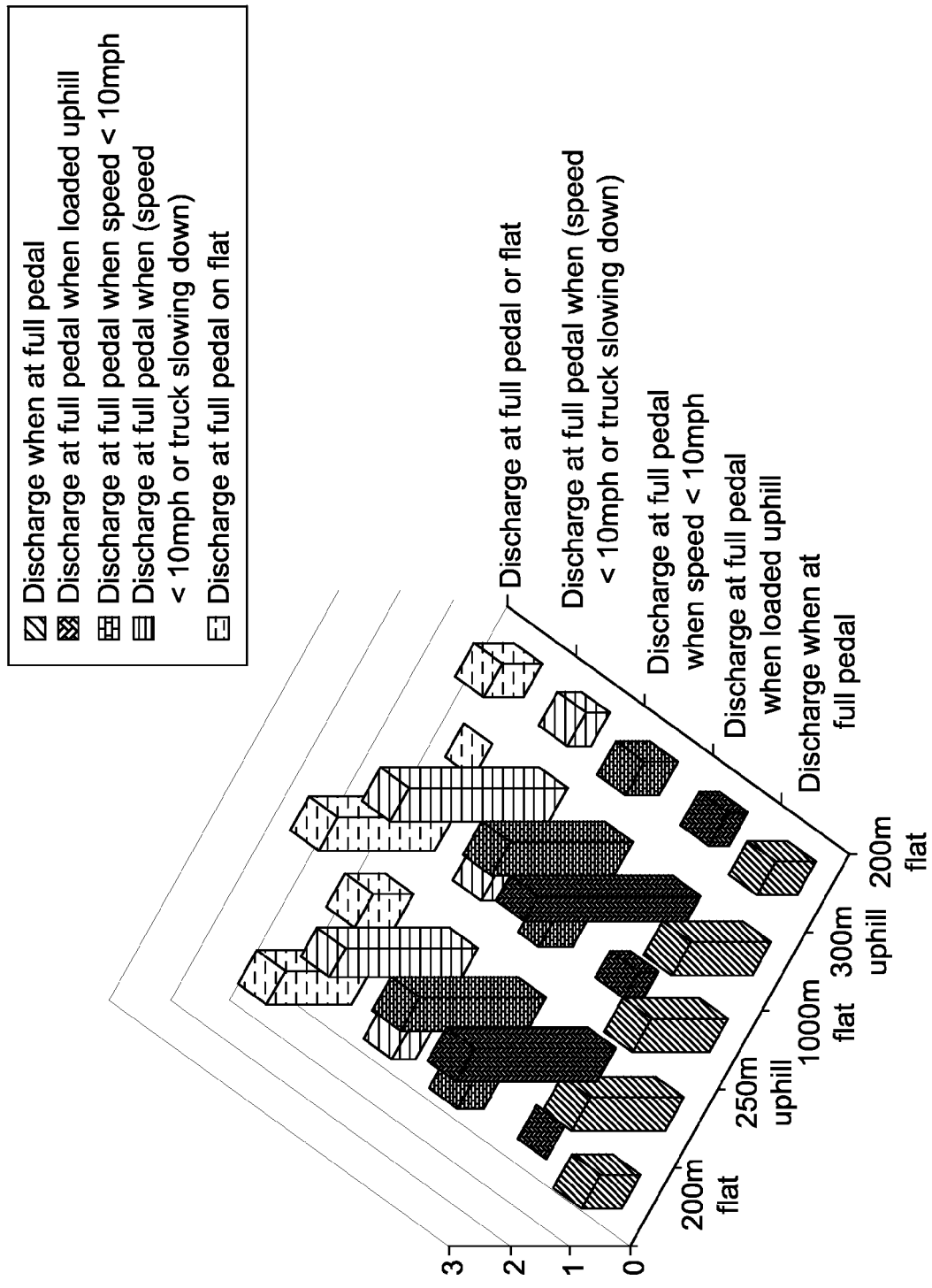
FIG. 9 shows in chart form comparative results of the rules shown in FIGS. 2-6, when implemented along the exemplary haul route shown in FIG. 7.

FIG. 8 shows a plot of position vs. time for each of the five discharge rules, by comparison to the baseline position vs. time. FIG. 9 shows in chart form an excess of regenerative speed above baseline speed along each of five exemplary haul segments, for the exemplary discharge rules according to embodiments of the invention.

For the specific elevation profile shown, the different discharge rules result in improvements over baseline (non-regenerative) propulsion, per exemplary haul run, as shown in Table 1:

| (Rule) Description | Speed excess (mph) | Fuel save (gallons) |
|---|---|---|
| (200) Discharge when at full throttle | 6.08 | −6.56 |
| (300) Discharge at full throttle when loaded uphill | 6.19 | −6.93 |
| (400) Discharge at full throttle when speed <10 mph | 6.08 | −6.77 |
| (500) Discharge at full throttle on flat | 5.14 | −5.8 |
| (600) Discharge at full throttle when (speed <10 mph OR truck slowing down) | 6.29 | −6.86 |

Figure 10:
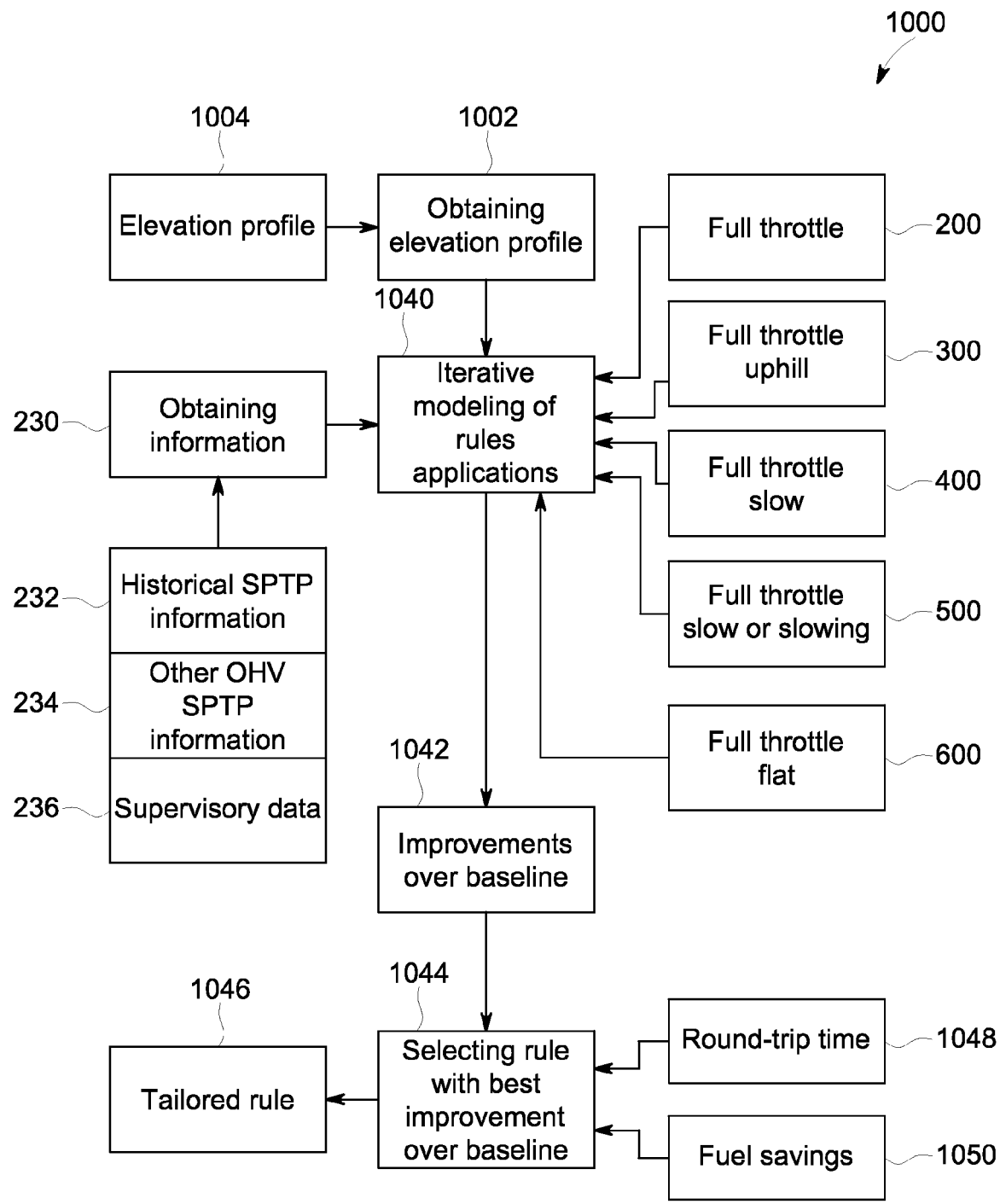
FIG. 10 shows a flowchart for selecting which rule to use on an arbitrary given haul route.

Because the relative worth of the discharge rules will vary according to the haul run elevation profile, a selection rule 1000 (FIG. 10) is provided for generating a table, such as Table 1, for choosing which discharge rule to use for an arbitrary haul route. Turning to FIG. 10, the selection rule 1000 includes obtaining 1002 an elevation profile 1004 of the haul route; and obtaining 230 information such as SPTP information 232, 234 and supervisory data 236. Based on the elevation profile and the information obtained, the method 1000 also includes iteratively modeling 1040 application of each rule 200, 300, 400, 500, or 600 to a standard haul route on the elevation profile 1004. Various methods are known for modeling the performance of an OHV in response to engine transients and elevation changes. Each modeling 1040 produces a set of improvements 1042 over baseline for each rule (as shown in Table1). The method 1000 continues to selecting 1044 a tailored rule 1046 that offers the best improvement over baseline, in terms of round-trip time 1048, fuel savings 1050, or other priority. The essence of the method 1000 is to generate a table such as Table 1, above, and to select the rule that provides the largest speed excess, the largest fuel savings, or a compromise between improved speed excess and fuel savings.

Figure 11:
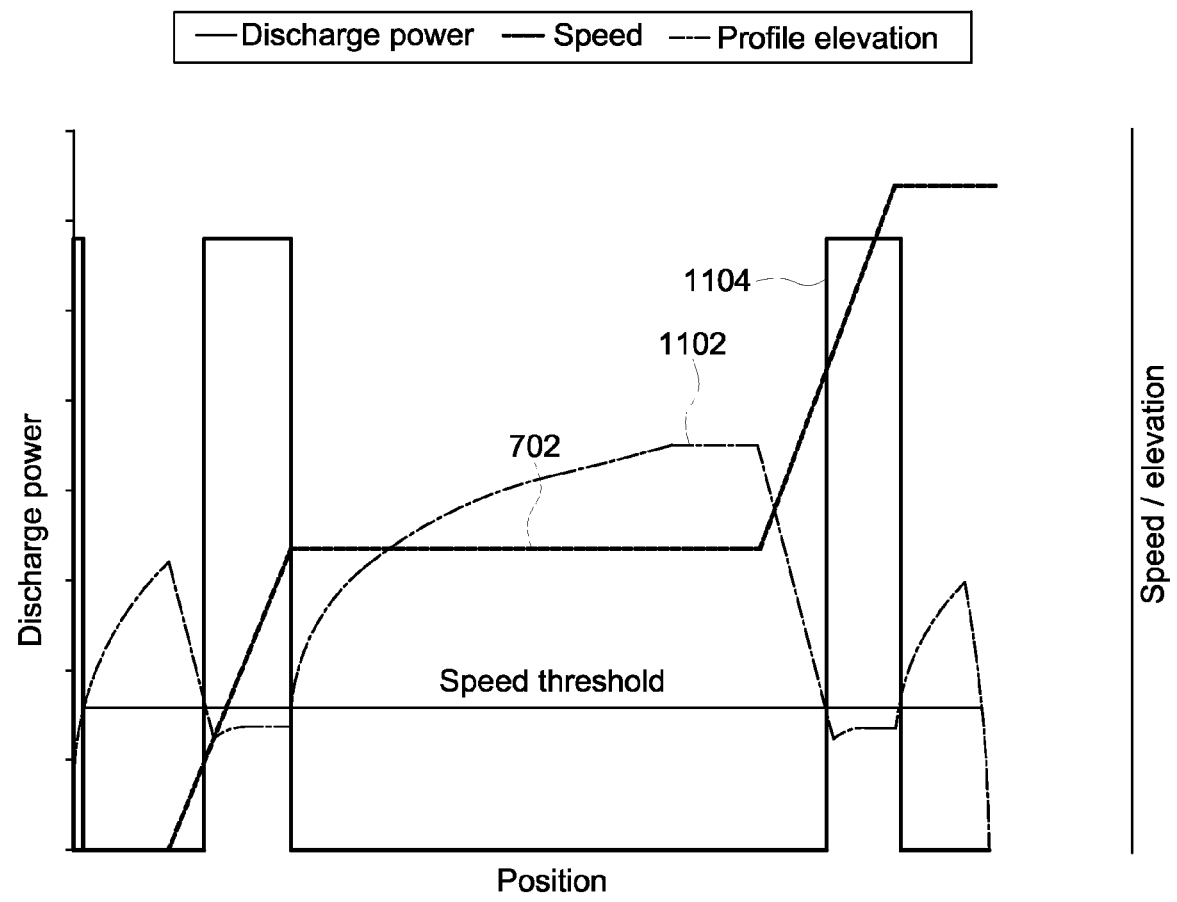
FIG. 11 shows a plot of speed and discharge power vs. position for an implementation, on the exemplary haul route shown in FIG. 7, of the third rule shown in FIG. 4.

FIG. 11 shows a plot of speed 1102 and discharge power 1104, relative to position along the exemplary elevation profile 702, for an implementation of the third rule 400. It can be seen that by augmenting engine power only while the vehicle is slowing at full throttle below a threshold speed, significant loss of velocity (and loss of time) is averted using a relatively small amount of regenerative energy. Thereby, the size of the regenerative energy storage system 114 can be reduced.

Thus, in embodiments, an energy management system comprises an energy management module electrically connecting an energy storage system of a vehicle with a traction link of the vehicle, the traction link being electrically connected to a traction motor. The energy management module is configured to deliver electrical power from the energy storage system to the traction link during a haul route, according to a discharge rule that is selected by a comparison of predicted performance of a plurality of discharge rules to a baseline performance of the haul route, in which electrical power is not delivered from the energy storage system to the traction link, in order to obtain fuel savings, speed excess, or a combination of fuel savings and speed excess relative to the baseline performance. In certain embodiments, the energy management system is installed in a vehicle that has an engine and an alternator mutually configured to deliver electrical power to the traction link, and an interface for transmitting a throttle signal from an operator to one of the engine or the alternator, and to the energy management module, for varying the electrical power delivered to the traction link; the energy management module is configured to receive the throttle signal and information indicative of vehicle position, and the discharge rule is to deliver electrical power from the energy storage system to the traction link when the vehicle is at full throttle on an uphill segment. For example, the energy management module may be configured to receive the throttle signal and information indicative of vehicle position, and to control the delivery of the electrical power from the energy storage system to the traction link during the haul route, according to the discharge rule, when the throttle signal indicates the vehicle is at full throttle and the information indicative of vehicle position indicates the vehicle is traveling on an uphill segment.

In certain embodiments, the energy management system is installed in a vehicle that has an engine and an alternator mutually configured to deliver electrical power to the traction link, and an interface for transmitting a throttle signal from an operator to one of the engine or the alternator, and to the energy management module, for varying the electrical power delivered to the traction link; the energy management module is configured to receive the throttle signal and information indicative of vehicle speed, and the discharge rule is to deliver electrical power from the energy storage system to the traction link when the vehicle is at full throttle and vehicle speed is below a threshold value. For example, the energy management module may be configured to receive the throttle signal and information indicative of vehicle speed, and to control the delivery of the electrical power from the energy storage system to the traction link during the haul route, according to the discharge rule, when the throttle signal indicates the vehicle is at full throttle and the information indicative of vehicle speed indicates the vehicle speed is below the threshold value.

In certain embodiments, the energy management system is installed in a vehicle that has an engine and an alternator mutually configured to deliver electrical power to the traction link, and an interface for transmitting a throttle signal from an operator to one of the engine or the alternator, and to the energy management module, for varying the electrical power delivered to the traction link; the energy management module is configured to receive the throttle signal and information indicative of vehicle speed, and the discharge rule is to deliver electrical power from the energy storage system to the traction link when the vehicle is at full throttle and vehicle speed is below a threshold value, or slowing. For example, the energy management module may be configured to receive the throttle signal and information indicative of vehicle speed, and to control the delivery of the electrical power from the energy storage system to the traction link during the haul route, according to the discharge rule, when the throttle signal indicates the vehicle is at full throttle and the information indicative of vehicle speed indicates the vehicle speed is below the threshold value, and/or when the throttle signal indicates the vehicle is at full throttle and the information indicative of vehicle speed indicates the vehicle speed is slowing.

In certain embodiments, the energy management system is installed in a vehicle that has an engine and an alternator mutually configured to deliver electrical power to the traction link, and an interface for transmitting a throttle signal from an operator to one of the engine or the alternator, and to the energy management module, for varying the electrical power delivered to the traction link; the energy management module is configured to receive the throttle signal and information indicative of vehicle position, and the discharge rule is to deliver electrical power from the energy storage system to the traction link when the vehicle is at full throttle and the vehicle is on a flat segment. For example, the energy management module may be configured to receive the throttle signal and information indicative of vehicle position, and to control the delivery of the electrical power from the energy storage system to the fraction link during the haul route, according to the discharge rule, when the throttle signal indicates the vehicle is at full throttle and the information indicative of vehicle position indicates the vehicle is traveling on a flat segment.

In certain embodiments, the energy management system is installed in a vehicle that has an engine and an alternator mutually configured to deliver electrical power to the traction link, and an interface for transmitting a throttle signal from an operator to one of the engine or the alternator, and to the energy management module, for varying the electrical power delivered to the traction link; the energy management module is configured to receive the throttle signal and information indicative of vehicle speed, and the discharge rule is to deliver electrical power from the energy storage system to the traction link when the vehicle is at full throttle and vehicle speed is below a threshold value and slowing. For example, the energy management module may be configured to receive the throttle signal and information indicative of vehicle speed, and to control the delivery of the electrical power from the energy storage system to the fraction link during the haul route, according to the discharge rule, when the throttle signal indicates the vehicle is at full throttle and the information indicative of vehicle speed indicates the vehicle speed is both below the threshold value and slowing.

In certain embodiments, the energy management system is installed in a vehicle that has an engine and an alternator mutually configured to deliver electrical power to the traction link, and an interface for transmitting a throttle signal from an operator to one of the engine or the alternator, and to the energy management module, for varying the electrical power delivered to the traction link; the energy management module is configured to receive the throttle signal and information indicative of vehicle speed, and the discharge rule is to deliver electrical power from the energy storage system to the traction link when the vehicle is at full throttle and vehicle speed is below a threshold value and not increasing at a desired rate. For example, the energy management module may be configured to receive the throttle signal and information indicative of vehicle speed, and to control the delivery of the electrical power from the energy storage system to the traction link during the haul route, according to the discharge rule, when the throttle signal indicates the vehicle is at full throttle and the information indicative of vehicle speed indicates the vehicle speed is both below the threshold value and not increasing at a desired rate.

In certain embodiments, the energy management module is configured to deliver electrical power to the traction link at a substantially constant discharge rate that is set according to a regenerative energy balance that takes into account the discharge rule. For example, the regenerative energy balance may incorporate a discharge time that is based on a total duration of a discharge condition. As another example, the total duration of the discharge condition may be measured under a baseline mode of operation. Alternatively, the total duration of the discharge condition may be measured under a previous implementation of the same rule as to be applied by the energy management module. Alternatively, the total duration of the discharge condition may be obtained from modeling implementation of the discharge rule, based at least on information external to the present implementation of the discharge rule. In other embodiments, the information external to the present implementation of the discharge rule may include historic information regarding at least one previous implementation of the discharge rule. In certain embodiments, the energy management system is installed in a vehicle that has an engine and an alternator mutually configured to deliver electrical power to the traction link, and an interface for transmitting a braking signal to the energy management module, for varying the electrical power allocated from the traction link; the energy management module is configured to allocate electrical current from the traction link to the energy storage system in response to the braking signal.

In another embodiment, an energy management system comprises an energy management module electrically connecting an energy storage system of a vehicle with a traction link of the vehicle. The traction link is electrically connected to a traction motor. The energy management module is configured to deliver electrical power from the energy storage system to the traction link during a haul route according to at least one discharge rule. The at least one discharge rule is selected to improve fuel savings, speed excess, or a combination of fuel savings and speed excess relative to a baseline performance of the haul route in which electrical power is not delivered from the energy storage system to the traction link. For example, the energy management module may be configured to receive one or more of a throttle signal, information indicative of vehicle speed, and/or information indicative of vehicle position. The at least one discharge rule may comprise one or more of: deliver electrical power from the energy storage system to the traction link when the vehicle is at full throttle on an uphill segment; deliver electrical power from the energy storage system to the traction link when the vehicle is at full throttle and vehicle speed is below a threshold value; deliver electrical power from the energy storage system to the traction link when the vehicle is at full throttle and vehicle speed is below a threshold value, or slowing; deliver electrical power from the energy storage system to the traction link when the vehicle is at full throttle and the vehicle is on a flat segment; deliver electrical power from the energy storage system to the traction link when the vehicle is at full throttle and vehicle speed is below a threshold value and slowing; and/or deliver electrical power from the energy storage system to the traction link when the vehicle is at full throttle and vehicle speed is below a threshold value and not increasing at a desired rate. (In different embodiments, the energy management module may be configured to carry out one of the discharge rules, or two or more of the discharge rules, in various combinations, depending on the vehicle, haul route, etc. as discussed herein, see, e.g., FIG. 10 and related description.) In an embodiment, the energy management module includes program instructions for carrying out all the discharge rules, but in practice the energy management module only caries out one or several of the rules (or in any event, fewer than all the rules), again, depending on the vehicle, haul route, etc. as discussed herein. Thus, in embodiments, the energy management module is also configured to select which one or more of the several discharge rules (of the program instructions) to carry out, or the selection of which one or more of the several discharge rules (of the program instructions) to carry out may be based on user input, a factory or field configuration of the energy management module as between the programmed plural discharge rules, or the like.

In aspects, a method is provided for operating an OHV or other vehicle along a return route and a haul route. The vehicle includes an engine and an alternator mutually configured to deliver electrical power to a traction link, a traction motor electrically connected with the traction link, an energy storage system electrically connected with the traction link, and an energy management module electrically connecting the energy storage system with the traction link. The method comprises receiving a braking signal at the energy management module during the return route, and in response to the braking signal, configuring the energy management module to transfer electrical power from the traction link to the energy storage system. The method also comprises monitoring a quantity of energy transferred from the traction link to the energy storage system. The method also comprises receiving at the energy management module, during the haul route, information including at least a throttle signal; evaluating in the energy management module whether the received information establishes a discharge condition; and, in case a discharge condition is established, configuring the energy management module to transfer electrical power from the energy storage system to the traction link, according to a discharge rule. For example, in aspects, the information received at the energy management module may include the throttle signal and information indicative of vehicle position, and the discharge rule may be to deliver electrical power from the energy storage system to the traction link when the vehicle is at full throttle on an uphill segment. Thus, in an embodiment, the method comprises, in case a discharge condition is established, configuring the energy management module to transfer electrical power from the energy storage system to the traction link, when the vehicle is at full throttle on an uphill segment.

In aspects, the information received at the energy management module may include the throttle signal and information indicative of vehicle speed, and the discharge rule may be to deliver electrical power from the energy storage system to the traction link when the vehicle is at full throttle and vehicle speed is below a threshold value. Thus, in an embodiment, the method comprises, in case a discharge condition is established, configuring the energy management module to transfer electrical power from the energy storage system to the traction link, when the vehicle is at full throttle and vehicle speed is below a threshold value.

In aspects, the information received at the energy management module may include the throttle signal and information indicative of vehicle speed, and the discharge rule may be to deliver electrical power from the energy storage system to the traction link when the vehicle is at full throttle and vehicle speed is below a threshold value, or slowing. Thus, in an embodiment, the method comprises, in case a discharge condition is established, configuring the energy management module to transfer electrical power from the energy storage system to the traction link when (i) the vehicle is at full throttle and vehicle speed is below a threshold value, and/or (ii) the vehicle is at full throttle and vehicle speed is slowing.

In aspects, the information received at the energy management module may include the throttle signal and information indicative of vehicle position, and the discharge rule may be to deliver electrical power from the energy storage system to the traction link when the vehicle is at full throttle and the vehicle is on a flat segment. Thus, in an embodiment, the method comprises, in case a discharge condition is established, configuring the energy management module to transfer electrical power from the energy storage system to the traction link, when the vehicle is at full throttle on a flat segment.

In aspects, the information received at the energy management module may include the throttle signal and information indicative of vehicle speed, and the discharge rule may be to deliver electrical power from the energy storage system to the traction link when the vehicle is at full throttle and vehicle speed is below a threshold value and slowing. Thus, in an embodiment, the method comprises, in case a discharge condition is established, configuring the energy management module to transfer electrical power from the energy storage system to the traction link when the vehicle is at full throttle and vehicle speed is both below a threshold value and slowing.

In aspects, the information received at the energy management module may include the throttle signal and information indicative of vehicle speed, and the discharge rule may be to deliver electrical power from the energy storage system to the traction link when the vehicle is at full throttle and vehicle speed is below a threshold value and not increasing at a desired rate. Thus, in an embodiment, the method comprises, in case a discharge condition is established, configuring the energy management module to transfer electrical power from the energy storage system to the traction link when the vehicle is at full throttle and vehicle speed is both below a threshold value and not increasing at a desired rate.

In aspects, the energy management module may be configured to transfer electrical power to the traction link at a substantially constant discharge rate that may be set according to a regenerative energy balance that takes into account the discharge rule. In aspects, the regenerative energy balance incorporates a discharge time that may be based on a total duration of a discharge condition. In aspects, the total duration of the discharge condition may be measured under a baseline mode of operation. In aspects, the total duration of the discharge condition may be measured under a previous implementation of the same rule as to be applied by the energy management module. In aspects, the total duration of the discharge condition may be obtained from modeling implementation of the discharge rule, based at least on information external to the present implementation of the discharge rule. In certain aspects, the information external to the present implementation of the discharge rule may include historic information regarding at least one previous implementation of the discharge rule.

In an embodiment, a method for operating a vehicle along a return route and a haul route comprises receiving a braking signal at an energy management module of the vehicle during the return route. The vehicle includes an engine and an alternator mutually configured to deliver electrical power to a traction link, a traction motor electrically connected with the traction link, an energy storage system electrically connected with the traction link, and the energy management module electrically connecting the energy storage system with the traction link. The method further comprises, in response to the braking signal, configuring the energy management module to transfer electrical power from the traction link to the energy storage system. The method further comprises monitoring a quantity of energy transferred from the traction link to the energy storage system, receiving at the energy management module during the haul route information including at least a throttle signal, and evaluating in the energy management module whether the received information establishes a discharge condition. The method further comprises, in case a discharge condition is established, configuring the energy management module to transfer electrical power from the energy storage system to the traction link, according to a discharge rule. The energy management module is configured to transfer electrical power to the traction link at a substantially constant discharge rate that is set according to a regenerative energy balance that takes into account the discharge rule.

In an embodiment, a method for operating a vehicle along a return route and a haul route comprises receiving a braking signal at an energy management module of the vehicle during the return route. The vehicle includes an engine and an alternator mutually configured to deliver electrical power to a traction link, a traction motor electrically connected with the traction link, an energy storage system electrically connected with the traction link, and the energy management module electrically connecting the energy storage system with the traction link. The method further comprises, in response to the braking signal, configuring the energy management module to transfer electrical power from the traction link to the energy storage system. The method further comprises monitoring a quantity of energy transferred from the traction link to the energy storage system, receiving at the energy management module during the haul route information including at least a throttle signal, and evaluating in the energy management module whether the received information establishes a discharge condition. The method further comprises, in case a discharge condition is established, configuring the energy management module to transfer electrical power from the energy storage system to the traction link, according to a discharge rule. The energy management module is configured to transfer electrical power to the traction link at a substantially constant discharge rate that is set according to a regenerative energy balance that takes into account the discharge rule. The regenerative energy balance incorporates a discharge time that is based on a total duration of a discharge condition.

In an embodiment, a method for operating a vehicle along a return route and a haul route comprises receiving a braking signal at an energy management module of the vehicle during the return route. The vehicle includes an engine and an alternator mutually configured to deliver electrical power to a traction link, a traction motor electrically connected with the traction link, an energy storage system electrically connected with the traction link, and the energy management module electrically connecting the energy storage system with the traction link. The method further comprises, in response to the braking signal, configuring the energy management module to transfer electrical power from the traction link to the energy storage system. The method further comprises monitoring a quantity of energy transferred from the traction link to the energy storage system, receiving at the energy management module during the haul route information including at least a throttle signal, and evaluating in the energy management module whether the received information establishes a discharge condition. The method further comprises, in case a discharge condition is established, configuring the energy management module to transfer electrical power from the energy storage system to the traction link, according to a discharge rule. The energy management module is configured to transfer electrical power to the traction link at a substantially constant discharge rate that is set according to a regenerative energy balance that takes into account the discharge rule. The regenerative energy balance incorporates a discharge time that is based on a total duration of a discharge condition. The total duration of the discharge condition is measured under a baseline mode of operation.

In an embodiment, a method for operating a vehicle along a return route and a haul route comprises receiving a braking signal at an energy management module of the vehicle during the return route. The vehicle includes an engine and an alternator mutually configured to deliver electrical power to a traction link, a traction motor electrically connected with the traction link, an energy storage system electrically connected with the traction link, and the energy management module electrically connecting the energy storage system with the traction link. The method further comprises, in response to the braking signal, configuring the energy management module to transfer electrical power from the traction link to the energy storage system. The method further comprises monitoring a quantity of energy transferred from the traction link to the energy storage system, receiving at the energy management module during the haul route information including at least a throttle signal, and evaluating in the energy management module whether the received information establishes a discharge condition. The method further comprises, in case a discharge condition is established, configuring the energy management module to transfer electrical power from the energy storage system to the traction link, according to a discharge rule. The energy management module is configured to transfer electrical power to the traction link at a substantially constant discharge rate that is set according to a regenerative energy balance that takes into account the discharge rule. The regenerative energy balance incorporates a discharge time that is based on a total duration of a discharge condition. The total duration of the discharge condition is measured under a previous implementation of the same rule as to be applied by the energy management module.

In an embodiment, a method for operating a vehicle along a return route and a haul route comprises receiving a braking signal at an energy management module of the vehicle during the return route. The vehicle includes an engine and an alternator mutually configured to deliver electrical power to a traction link, a traction motor electrically connected with the traction link, an energy storage system electrically connected with the traction link, and the energy management module electrically connecting the energy storage system with the traction link. The method further comprises, in response to the braking signal, configuring the energy management module to transfer electrical power from the traction link to the energy storage system. The method further comprises monitoring a quantity of energy transferred from the traction link to the energy storage system, receiving at the energy management module during the haul route information including at least a throttle signal, and evaluating in the energy management module whether the received information establishes a discharge condition. The method further comprises, in case a discharge condition is established, configuring the energy management module to transfer electrical power from the energy storage system to the traction link, according to a discharge rule. The energy management module is configured to transfer electrical power to the traction link at a substantially constant discharge rate that is set according to a regenerative energy balance that takes into account the discharge rule. The regenerative energy balance incorporates a discharge time that is based on a total duration of a discharge condition. The total duration of the discharge condition is obtained from modeling implementation of the discharge rule, based at least on information external to the present implementation of the discharge rule.

In an embodiment, a method for operating a vehicle along a return route and a haul route comprises receiving a braking signal at an energy management module of the vehicle during the return route. The vehicle includes an engine and an alternator mutually configured to deliver electrical power to a traction link, a traction motor electrically connected with the traction link, an energy storage system electrically connected with the traction link, and the energy management module electrically connecting the energy storage system with the traction link. The method further comprises, in response to the braking signal, configuring the energy management module to transfer electrical power from the traction link to the energy storage system. The method further comprises monitoring a quantity of energy transferred from the traction link to the energy storage system, receiving at the energy management module during the haul route information including at least a throttle signal, and evaluating in the energy management module whether the received information establishes a discharge condition. The method further comprises, in case a discharge condition is established, configuring the energy management module to transfer electrical power from the energy storage system to the traction link, according to a discharge rule. The energy management module is configured to transfer electrical power to the traction link at a substantially constant discharge rate that is set according to a regenerative energy balance that takes into account the discharge rule. The regenerative energy balance incorporates a discharge time that is based on a total duration of a discharge condition. The total duration of the discharge condition is obtained from modeling implementation of the discharge rule, based at least on information external to the present implementation of the discharge rule. The information external to the present implementation of the discharge rule includes historic information regarding at least one previous implementation of the discharge rule.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. An energy management system comprising:
an energy management module electrically connecting an energy storage system of a vehicle with a traction link of the vehicle, the traction link being electrically connected to a traction motor, and the vehicle including an interface for transmitting a throttle signal from an operator to the energy management module for varying the electrical power delivered to the traction link; and
the energy management module configured to deliver electrical power from the energy storage system to the traction link during a route according to a discharge rule, the discharge rule is selected by a comparison of predicted performance of a plurality of discharge rules to a baseline performance of the route, in which electrical power is not delivered from the energy storage system to the traction link, in order to obtain fuel savings, speed excess, or a combination of fuel savings and speed excess relative to the baseline performance;
wherein the energy management module is configured to receive the throttle signal and information indicative of vehicle speed; and
wherein the discharge rule is to deliver electrical power from the energy storage system to the traction link in dependence upon at least the vehicle speed.

2. The energy management system as claimed in claim 1, wherein the energy management module is configured to receive the throttle signal and information indicative of vehicle position, and
the discharge rule is to deliver electrical power from the energy storage system to the traction link when the vehicle is at full throttle on an uphill segment.

3. The energy management system as claimed in claim 1, wherein the discharge rule is to deliver electrical power from the energy storage system to the traction link when the vehicle is at full throttle and vehicle speed is below a threshold value, or slowing.

4. The energy management system as claimed in claim 1, wherein the energy management module is configured to receive the throttle signal and information indicative of vehicle position, and
the discharge rule is to deliver electrical power from the energy storage system to the traction link when the vehicle is at full throttle and the vehicle is on a flat segment.

5. The energy management system as claimed in claim 1, wherein the discharge rule is to deliver electrical power from the energy storage system to the traction link when the vehicle is at full throttle and vehicle speed is below a threshold value and slowing.

6. The energy management system as claimed in claim 1, wherein the discharge rule is to deliver electrical power from the energy storage system to the traction link when the vehicle is at full throttle and vehicle speed is below a threshold value and not increasing at a desired rate.

7. The energy management system as claimed in claim 1, wherein the energy management module is configured to deliver electrical power to the traction link at a substantially constant discharge rate that is set according to a regenerative energy balance that takes into account the discharge rule.

8. The energy management system as claimed in claim 7, wherein the regenerative energy balance incorporates a discharge time that is based on a total duration of a discharge condition.

9. The energy management system as claimed in claim 8, wherein the total duration of the discharge condition is measured under a baseline mode of operation.

10. The energy management system as claimed in claim 8, wherein the total duration of the discharge condition is measured under a previous implementation of the same rule as to be applied by the energy management module.

11. The energy management system as claimed in claim 8, wherein the total duration of the discharge condition is obtained from modeling implementation of the discharge rule, based at least on information external to the present implementation of the discharge rule.

12. The energy management system as claimed in claim 11, wherein the information external to the present implementation of the discharge rule includes historic information regarding at least one previous implementation of the discharge rule.

13. The energy management system as claimed in claim 1 wherein the interface is also for transmitting a braking signal to the energy management module;
the energy management module configured to allocate electrical current from the traction link to the energy storage system in response to the braking signal.

14. An energy management system comprising:
an energy management module electrically connecting an energy storage system of a vehicle with a traction link of the vehicle, the traction link being electrically connected to a traction motor, and the vehicle including an interface for transmitting a throttle signal from an operator to the energy management module for varying the electrical power delivered to the traction link;
wherein the energy management module is configured to deliver electrical power from the energy storage system to the traction link during a route according to a discharge rule, the discharge rule is selected by a comparison of predicted performance of a plurality of discharge rules to a baseline performance of the route, in which electrical power is not delivered from the energy storage system to the traction link, in order to obtain fuel savings, speed excess, or a combination of fuel savings and speed excess relative to the baseline performance;
wherein the energy management module is configured to receive the throttle signal and information indicative of vehicle speed, and the discharge rule is one or more of: to deliver electrical power from the energy storage system to the traction link when the vehicle is at full throttle and vehicle speed is below a threshold value; to deliver electrical power from the energy storage system to the traction link when the vehicle is at full throttle and vehicle speed is below a threshold value, or slowing; to deliver electrical power from the energy storage system to the traction link when the vehicle is at full throttle and vehicle speed is below a threshold value and slowing; or to deliver electrical power from the energy storage system to the traction link when the vehicle is at full throttle and vehicle speed is below a threshold value and not increasing at a desired rate.

15. A method for operating a vehicle along a first route and a second route, the method comprising:
receiving a braking signal at an energy management module of the vehicle during the first route, the vehicle including an engine and an alternator mutually configured to deliver electrical power to a traction link, a traction motor electrically connected with the traction link, an energy storage system electrically connected with the traction link, and the energy management module electrically connecting the energy storage system with the traction link;
in response to the braking signal, configuring the energy management module to transfer electrical power from the traction link to the energy storage system;
monitoring a quantity of energy transferred from the traction link to the energy storage system;
receiving at the energy management module during the first route information including at least a throttle signal and information indicative of vehicle speed;
evaluating in the energy management module whether the received information establishes a discharge condition; and
in case a discharge condition is established, configuring the energy management module to transfer electrical power from the energy storage system to the traction link, according to a discharge rule;
wherein the discharge rule is to deliver electrical power from the energy storage system to the traction link in dependence upon at least the vehicle speed.

16. The method as claimed in claim 15, wherein the information received at the energy management module includes the throttle signal and information indicative of vehicle position, and
the discharge rule is to deliver electrical power from the energy storage system to the traction link when the vehicle is at full throttle on an uphill segment.

17. The method as claimed in claim 15, wherein
the discharge rule is to deliver electrical power from the energy storage system to the traction link when the vehicle is at full throttle and vehicle speed is below a threshold value, or slowing.

18. The method as claimed in claim 15, wherein the information received at the energy management module includes the throttle signal and information indicative of vehicle position, and
the discharge rule is to deliver electrical power from the energy storage system to the traction link when the vehicle is at full throttle and the vehicle is on a flat segment.

19. The method as claimed in claim 15, wherein
the discharge rule is to deliver electrical power from the energy storage system to the traction link when the vehicle is at full throttle and vehicle speed is below a threshold value and slowing.

20. The method as claimed in claim 15, wherein
the discharge rule is to deliver electrical power from the energy storage system to the traction link when the vehicle is at full throttle and vehicle speed is below a threshold value and not increasing at a desired rate.

21. The method as claimed in claim 15, wherein the energy management module is configured to transfer electrical power to the traction link at a substantially constant discharge rate that is set according to a regenerative energy balance that takes into account the discharge rule.

22. A method for operating a vehicle along a first route and a second route, the method comprising:
receiving a braking signal at an energy management module of the vehicle during the first route, the vehicle including an engine and an alternator mutually configured to deliver electrical power to a traction link, a traction motor electrically connected with the traction link, an energy storage system electrically connected with the traction link, and the energy management module electrically connecting the energy storage system with the traction link;
in response to the braking signal, configuring the energy management module to transfer electrical power from the traction link to the energy storage system;
monitoring a quantity of energy transferred from the traction link to the energy storage system;
receiving at the energy management module during the second route information including at least a throttle signal and information indicative of vehicle speed;
evaluating in the energy management module whether the received information establishes a discharge condition; and
in case a discharge condition is established, configuring the energy management module to transfer electrical power from the energy storage system to the traction link, according to a discharge rule;
wherein the discharge rule is one or more of: to deliver electrical power from the energy storage system to the traction link when the vehicle is at full throttle and vehicle speed is below a threshold value; to deliver electrical power from the energy storage system to the traction link when the vehicle is at full throttle and vehicle speed is below a threshold value, or slowing; to deliver electrical power from the energy storage system to the traction link when the vehicle is at full throttle and vehicle speed is below a threshold value and slowing; or to deliver electrical power from the energy storage system to the traction link when the vehicle is at full throttle and vehicle speed is below a threshold value and not increasing at a desired rate.

* * * * *